(12) United States Patent
McLean

(10) Patent No.: US 7,201,986 B2
(45) Date of Patent: Apr. 10, 2007

(54) ELECTROCHEMICAL CELLS FORMED ON PLEATED SUBSTRATES

(75) Inventor: Gerard Francis McLean, West Vancouver (CA)

(73) Assignee: Angstrom Power Incorporated, North Vancouver (CA)

( * ) Notice: Subject to any disclaimer, the term of this patent is extended or adjusted under 35 U.S.C. 154(b) by 0 days.

(21) Appl. No.: 11/047,557

(22) Filed: Feb. 2, 2005

(65) Prior Publication Data
US 2005/0249986 A1    Nov. 10, 2005

Related U.S. Application Data

(60) Provisional application No. 60/567,433, filed on May 4, 2004.

(51) Int. Cl.
*H01M 8/00*    (2006.01)
(52) U.S. Cl. ............................ 429/34; 429/38; 429/234
(58) Field of Classification Search ................. 429/30, 429/34, 35, 36, 37, 38, 163, 164, 129, 138, 429/139, 12, 13, 40, 233, 234, 122, 146, 429/147; 427/115
See application file for complete search history.

(56) References Cited

U.S. PATENT DOCUMENTS

2003/0114297 A1* 6/2003 Shinn et al. ................. 502/159
2004/0018412 A1* 1/2004 Orsbon et al. ................. 429/37
2004/0028973 A1* 2/2004 Pan et al. ...................... 429/30
2005/0048364 A1* 3/2005 Coffey et al. ............... 429/163

FOREIGN PATENT DOCUMENTS

| CA | 1231128 | 1/1988 |
| CA | 2329064 A1 | 11/1999 |
| CA | 2354910 A1 | 4/2002 |
| GB | 2339058 A | 1/2000 |
| JP | 2004185937 A | 7/2004 |

OTHER PUBLICATIONS

International Search Report for PCT/CA2005/000661, International Searching Authority, Sep. 6, 2005, pp. 1-3.

* cited by examiner

*Primary Examiner*—Patrick Joseph Ryan
*Assistant Examiner*—Monique M Wills
(74) *Attorney, Agent, or Firm*—Oyen, Wiggs, Green & Mutala LLP

(57) ABSTRACT

A sheet of substrate material is corrugated. First and second troughs are defined on opposed faces of the substrate material. Ion-conducting regions are located in a common wall of the first and second troughs. In the ion-conducting regions ions can pass through the substrate material between the first and second troughs.

29 Claims, 11 Drawing Sheets

US 7,201,986 B2

ELECTROCHEMICAL CELLS FORMED ON PLEATED SUBSTRATES

CROSS-REFERENCE TO RELATED APPLICATION

The subject matter of this application is related to that of a co-owned application entitled "ELECTROCHEMICAL CELLS HAVING CURRENT-CARRYING STRUCTURES UNDERLYING ELECTROCHEMICAL REACTION LAYERS" filed concurrently herewith and a co-owned application entitled "MEMBRANES AND ELECTROCHEMICAL CELLS INCORPORATING SUCH MEMBRANES" filed concurrently herewith, both of which are hereby incorporated by reference herein. This application claims the benefit of U.S. application Ser. No. 60/567,433 filed on 4 May 2004, which is hereby incorporated by reference herein.

TECHNICAL FIELD

This invention pertains to electrochemical cells. Some embodiments of the invention relate to fuel cells. Other embodiments of the invention relate to electrochemical reactors of other types such as chlor-alkali reactors, electrolysis reactors and the like.

BACKGROUND

A fuel cell is an electrochemical energy conversion device that facilitates combining a fuel, such as hydrogen gas or a hydrocarbon, with an oxidizing agent, for example air or oxygen, in one or more chemical reactions to produce electricity.

A typical fuel cell includes an ion conducting membrane, such as a proton exchange membrane. The membrane separates a fuel on one side of the membrane from an oxidant on the other side of the membrane. The fuel is decomposed in a chemical reaction that liberates ions, typically protons, that travel through the membrane. After traveling through the membrane, the ions combine with the oxidant. The chemical reactions generate an electromotive force that can cause an electrical current to flow in an external circuit. A number of fuel cells are typically electrically connected in series to produce a desired output voltage.

A significant problem with many fuel cell designs is that they require many seals. Making reliable seals between the components of fuel cells in fuel cell stacks presents numerous technical problems. Some fuel cells have a large number of parts. Assembling such fuel cells can be time consuming and expensive.

Maintaining effective seals also presents problems in the design of other types of electrochemical reactor such as chlor-alkali cells or electrolysis cells.

Some fuel cell systems include frames which support a number of membrane electrode assemblies ("MEAs") in parallel spaced apart relationship to one another. The frames include face seals which prevent fuel and oxidant from mixing with one another. FIGS. 1 and 2 schematically show prior art fuel cell systems 100 and 200. Fuel cell systems 100 and 200 include electrolyte membranes 104 supported by thin frames 102. Frames 102 are made of a suitable material, such as stainless steel.

Each membrane 104 is located between two frames 102. First and second face seals 110, 112 seal each frame to adjacent membranes 104. First and second electrically conductive catalyst layers 106, 108 are disposed on either side of each membrane. First and second gas diffusion media 114, 116 are also present.

Thin frame designs of the type illustrated in FIGS. 1 and 2 generally work well and have considerable design flexibility. Fuel cell systems 100 and 200 can provide multiple series-connected fuel cells in a structure that can be made thin. Such cells can offer satisfactory air-breathing fuel cell performance with diffusion being the major transport mechanism for both fuel and oxidant delivery.

Fuel cell systems 100 and 200 suffer from the disadvantage that they include numerous face seals 110 and 112, between frames 102 and the electrolyte membranes 104. The surrounding structure must provide adequate support to make face seals 110 and 112 reliable. Design features intended to provide support for face seals 110 and 112 typically occupy volume within a fuel cell system without increasing the power output of the system. Such features tend to make the fuel cell systems volumetrically less efficient than would be ideal. Decreasing layer thickness increases the number of cells per layer but increases the number of face seals 110, 112.

There exists a need for electrochemical reactors, such as fuel cells, chlor-alkali cells and electrolysis cells which are reliable and cost effective to manufacture.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Many of the following example embodiments of electrochemical cells relate to fuel cells. The invention may also be applied to electrochemical reactors other than fuel cells.

Figure 1:
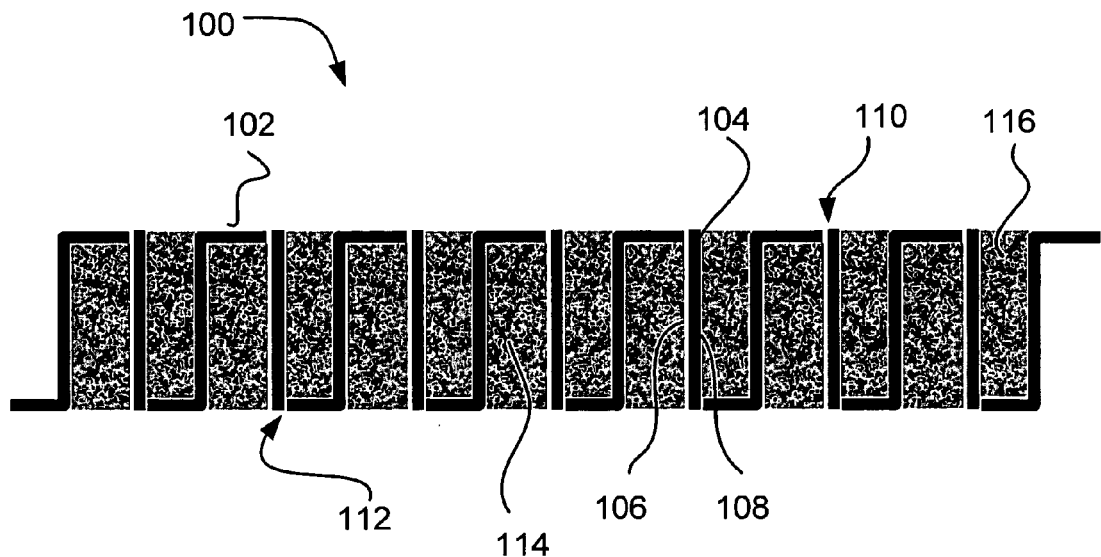
FIG. 1 is a cross-sectional view of a prior art fuel cell array having a sealed thin frame structure.
Figure 2:
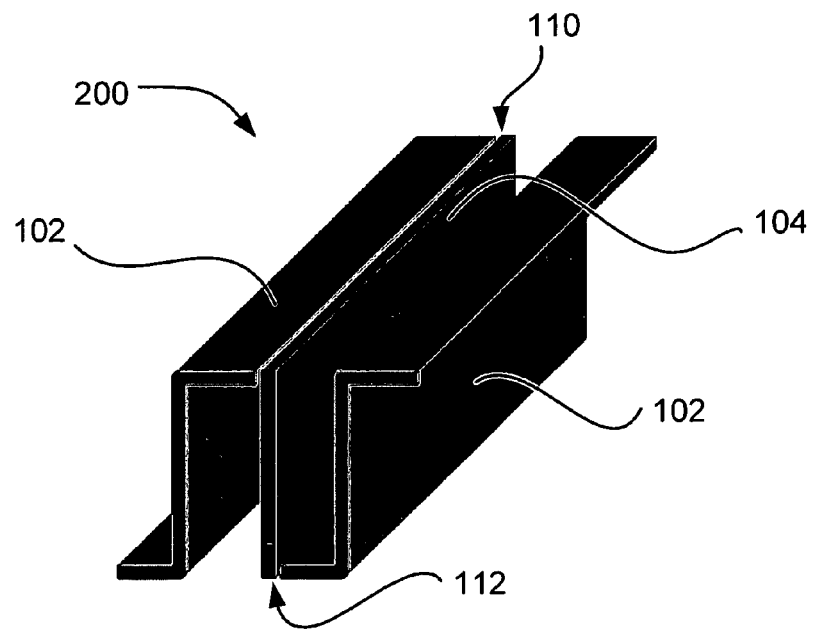
FIG. 2 is a perspective side view of a prior art fuel cell array having a sealed thin frame structure.
Figure 3:
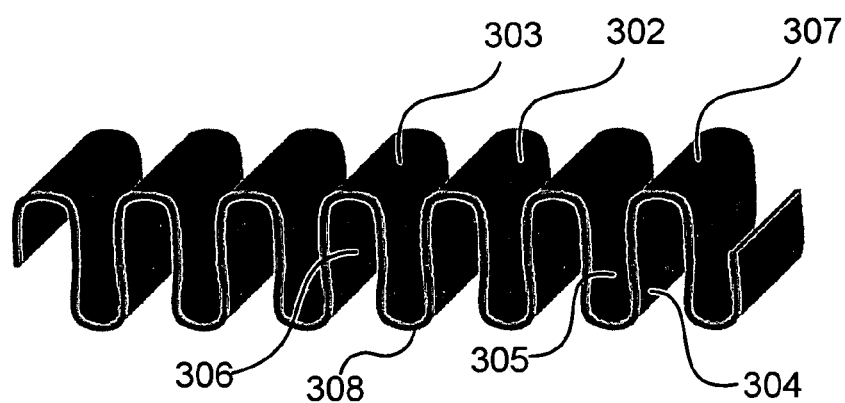
FIG. 3 illustrates an electrochemical cell array formed on a continuous piece of gas barrier material.

FIG. 3 shows a continuous undulating substrate sheet 302 that may be used as the basis for an array of electrochemical reactors such as fuel cells. Substrate sheet 302 may comprise a continuous piece of material bent into an undulating pattern. Sheet 302 has first and second faces 303 and 304. Face 303 has a number of alternating troughs 305 and peaks 307. Similarly, face 304 has a number of troughs 306 alternating with peaks 308. The properties of sheet 302 vary from place to place. Sheet 302 includes two or more of the following:

- areas that are electrically conductive;
- areas that are electrically insulating;
- areas that conduct ions (protons are an example of ions); and,
- areas that do not conduct ions.

The undulating form of sheet 302 provides a periodic structure of repeating elements.

Sheet 302 may serve as a barrier to reactants. For example, in a fuel cell in which one or both of the fuel and oxidant is a gas, sheet 302 may be substantially impermeable to gas (i.e. sheet 302 may provide a gas barrier).

An example of a material suitable for use as a substrate sheet 302 is flexible printed circuit board (PCB) materials. For example, a sheet of 12 microns thick Kapton™ is suitable for substrate 302 in a pleated fuel cell. PCB materials are dielectric materials. They can be made electrically conductive in selected areas by through-plating or providing filled vias using standard circuit board manufacturing techniques.

Those skilled in the art will understand that there are many other materials suitable for use as a substrate 302. The materials should be capable of being formed in or folded into a pleated configuration as described below. In some embodiments of the invention the substrate is prepared while in a substantially flat configuration and subsequently folded into a pleated configuration. For such embodiments the substrate material should be capable of being folded to form the pleats without breaking.

Figure 4:
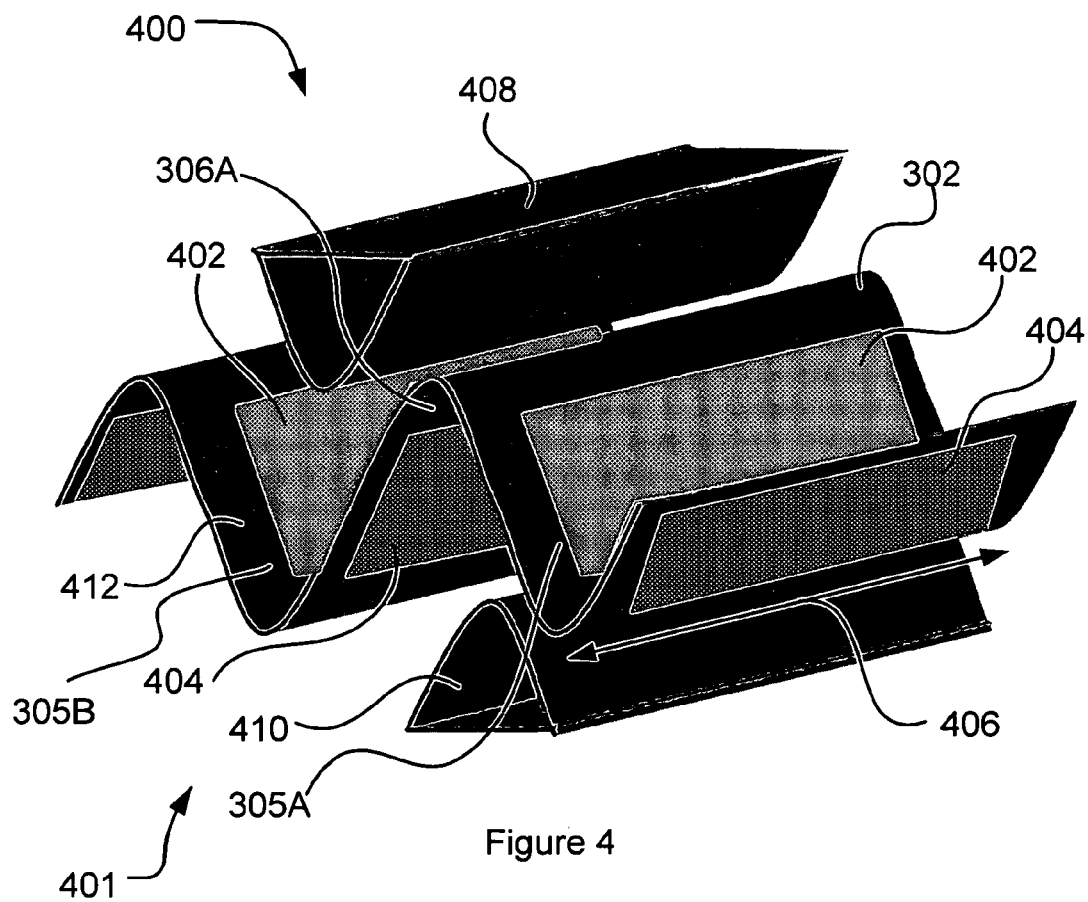
FIG. 4 is a schematic view of a pleated layer electrochemical cell.

FIG. 4 is an isometric view of a portion 400 of an undulating substrate sheet 302, a segment of which comprises a unit electrochemical cell 401. Sheet 302 has electron-conducting regions 402 and ion conducting regions 404 located so that trough 305 has an electrically conducting region 402 on one of its sides and an ion conducting region on its other side. Electron-conducting region 402 permits electricity to flow through sheet 302 between a trough 306A and an adjacent one 305A of troughs 305. Ion conducting region 404 permits ions to pass through sheet 302 from trough 306A to an adjacent one 305B of troughs 305, or vice versa. Troughs 305A and 305B are on opposing sides of trough 306A. Each unit electrochemical cell 401 occupies one trough 305 (e.g. trough 305A), one trough 306 (e.g. trough 306A) and the ion-conducting region 404 that lies in the portion of sheet 302 between them.

Providing electrically-conducting regions 402 is a good way of electrically connecting a number of unit electrochemical cells 401 in series with one another. As described below, unit cells 401 could also be electrically interconnected in other arrangements.

Gas diffusion media 408, 410 may be located in troughs 305 and 306 respectively. The gas diffusion media may be chosen to be porous and, in certain embodiments, electrically conductive. In some embodiments, the gas diffusion media 408 may comprise a powder that may be sintered. The gas diffusion media 408, 410 may also take other forms. For example, in some embodiments, the gas diffusion media may comprise inks or solid materials of suitable types. Reactants can be transported into fuel cell 401 by diffusion through media 408 and 410.

In some embodiments, gas diffusion media 408, 410 comprise electrically-conductive porous sintered powder materials. In some embodiments, gas diffusion media 408, 410 comprise mixtures of carbon black and one or more of PTFE powder, PVDF powder, such as Kynar™ powder, and silicon oxide powder. The carbon black may comprise any suitable finely divided carbon material such as one or more of acetylene black carbon, carbon fibers, carbon needles, carbon nanotubes, carbon nanoparticles.

Figure 4A:
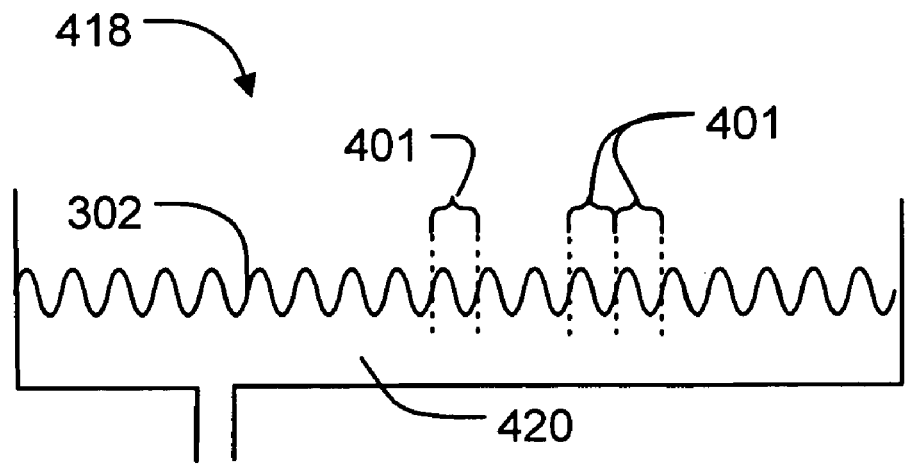
FIG. 4A is a cross-sectional schematic view of a pleated layer electrochemical cell with a fuel plenum.

FIG. 4A, shows an electrochemical apparatus 418 wherein a sheet 302 incorporating unit cells 401 defines one side of a plenum 420 containing a reactant (e.g. a fuel for a fuel cell). In this example, face 303 of sheet 302 is exposed to an ambient atmosphere, such as air, which may serve as an oxidant. Apparatus 418 does not require face seals between unit cells 401. The continuous sheet 302 does not have any parts through which the reactant can pass out of plenum 420. Plenum 420 is sealed around the edges of sheet 302. Sheet 302 is impermeable to the reactant.

Figure 4B:
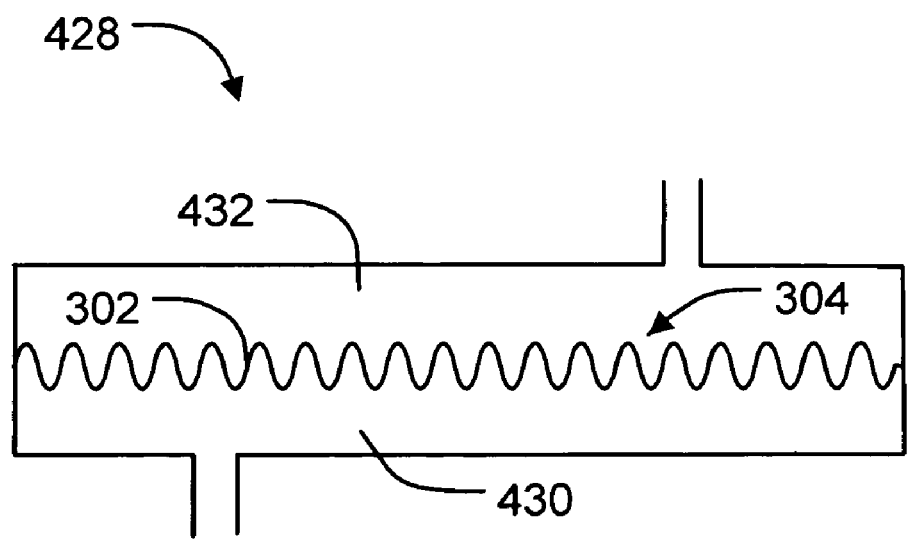
FIG. 4B is a cross-sectional schematic view of a pleated layer electrochemical cell with fuel and oxidant plenums.

FIG. 4B shows an electrochemical apparatus 428 wherein a sheet 302 incorporating unit cells 401 divides a volume into first and second plenums 430 and 432. Reactants may be introduced into both plenums 430 and 432. For example, one or more reactants for an oxidation portion of the reaction can be introduced to plenum 430 and one or more reactants for the a reduction reaction can be introduced to plenum 432. For example, where electrochemical apparatus 428 is configured as a fuel cell, a fuel may be introduced into plenum 430 and an oxidant may be introduced into plenum 432.

An example of an overall oxidation-reduction reaction that can take place in an electrochemical cell, and in particular in a fuel cell, is the reaction of hydrogen gas with oxygen to form water as follows.

Oxidation reaction (anode side):

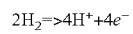
$$2H_2 => 4H^+ + 4e^-$$

Reduction reaction (cathode side):

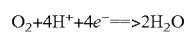
$$O_2 + 4H^+ + 4e^- => 2H_2O$$

Net reaction:

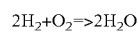
$$2H_2 + O_2 => 2H_2O$$

In this example, hydrogen gas ($H_2$) may be introduced into plenum 430 and oxygen gas ($O_2$) may be introduced into plenum 432.

Sheet 302 serves as a barrier that prevents reactants from passing directly between plenum 430 and plenum 432, or vice versa. Apparatuses 400, 418 and 428 do not require face seals between unit cells 401. All that is required is a suitable seal around the edges of sheet 302.

An undulating sheet 302 may be sealed around its edges in any suitable manner. For example, edge portions of the sheet 302 may be encapsulated in a suitable plastic, adhesive such as epoxy or the like. In some embodiments, sheet 302 is mounted to a carrier. In such embodiments, sheet 302 may be sealed around its edges to the carrier and the carrier may comprise one or more seals or sealing surfaces which permit the carrier to be sealed to a chamber holding a reactant.

Figure 5:
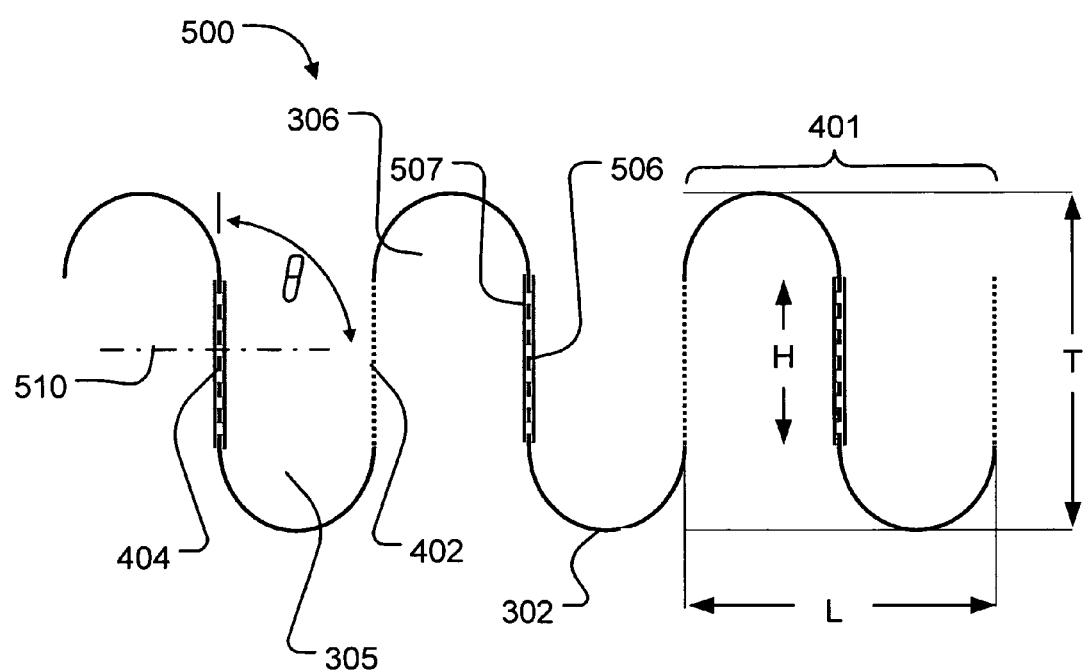
FIG. 5 is a cross-sectional schematic view of a pleated electrochemical cell.

FIG. 5 is a cross section of an undulating electrochemical cell structure 500 based on a sheet 302. Gas diffusion media are not shown in FIG. 5 for clarity. Gas diffusion media may fill troughs 305 and 306 of the undulating structure. Sheet 302 separates fuel from oxidant, eliminating the need for any explicit face seals. A large number of individual electrochemical cells may be formed on a single sheet 302.

Catalyst-containing electrodes 506 and 507 are deposited on, or adjacent to, ion-conducting regions 404. As is known to those skilled in the art of electrochemical cell design, suitable catalysts may be selected to facilitate the electrochemical reactions that are desired in the electrochemical cell. Electrodes 506 and 507 may be formed directly on sheet 302 on or adjacent to ion-conducting region 404 or may be formed in the gas diffusion media 408, 410 (See FIG. 4) adjacent to ion-conducting region 404.

The ion conducting regions 404 of unit cells 401 are oriented at a steep angle θ (for example 90 degrees) with respect to an average plane 510 of sheet 302. In some embodiments, θ is in the range of about 60 to 90 degrees. This permits the active areas of ion-conducting regions 404 to be larger relative to the length and width of each unit cell than they could be if sheet 302 were planar.

In some embodiments, the undulating layer formed by sheet 302 has a thickness T in the range of about 0.2 mm to 10 mm. Some currently-preferred embodiments have thicknesses of approximately 1 mm. Increasing the thickness permits increases in the areas of ion-conducting regions 404 and/or electrically conductive regions 402 without increasing the overall length and width of electrochemical cell structure 500. Thus, by increasing the thickness, T, one can provide increased power density. However, increasing the thickness increases the diffusion path length for reactant transport. Making the thickness too large could lead to mass transport limitations such as fuel or oxidant starvation or flooding for fuel cells.

In the illustrated embodiment, the gas diffusion media (not shown in FIG. 5) are electrically conductive and provide paths for electrical conduction between electrodes 506 and 507 and electrically conducting regions 402 that provide electrical interconnections either to other fuel cells or to external electrical circuits. Providing gas diffusion media that also serves to carry electrical current permits designs that avoid points where there is an undesirably large electrical current density.

The length L of each unit cell 401 (which is the same as the repeat period of the undulating pattern of sheet 302 in the illustrated embodiments) can also be varied. In some embodiments, L is of the same order of magnitude as the thickness T. For example, in the currently-preferred embodiments mentioned above, L is approximately 1 mm. L and T are not necessarily the same.

When the period of the structure (i.e. L) is smaller than the height H of ion-conducting regions 404, the resulting structure provides an electrochemically active area that is greater than the projected area of the structure itself. For example, in one embodiment the sheet 302 has an overall thickness T of 1 mm, a conductive region height H of 0.6 mm and a repeating period L of 0.4 mm. In this example, the length H of the ion-conducting region of the electrochemical cell is 50% longer than the length L for this unit cell (a "projected length" of pleated sheet 302 corresponding with the unit cell). When the width of the ion-conducting region is taken into account relative to the width of the sheet 302, this may result in the surface area of the ion-conducting region being up to 150% of the projected area of pleated sheet 302 itself.

In another example embodiment, T, H, and L have lengths of 1.0 mm, 0.5 mm and 0.5 mm respectively and the surface area of the ion-conducting regions may be up to 100% of the projected area of pleated sheet 302. In yet another embodiment, T, H, and L have lengths of 1.5 mm, 1.0 mm and 0.5 mm respectively, and the surface area of the ion-conducting regions of the electrochemical cell may be up to 200% of the projected area of pleated sheet 302.

It is to be understood that an undulating sheet on which electrochemical cells are formed does not necessarily lie on a plane. Such a sheet could follow a curved, angled, or irregular surface.

One example of a working embodiment uses 25 micron Kapton™ polyamide as a substrate 302 which is processed to form a pleated electrochemical cell layer according to the invention. The Kapton™ is patterned using photolithography and plated with copper on a first side in selected regions. The substrate is then partially drilled through to provide open pathways into the copper plating. The second, non-clad, side is then patterned by photolithography copper plated according to the photolithographic pattern. The drilled holes are filled during this process to create the desired electrically-conducting regions 402. The copper cladding is then gold plated for corrosion resistance. Using laser micromachining, openings are formed in selected regions to create ion-conducting regions 404. Nafion™ dispersion is cast into these opened regions and then a catalyst layer formulation is deposited directly onto the cast Nafion™ film to create catalyzed electrodes. The overall composite substrate 302 is then folded around narrow strips of porous carbon paper to create the desired 'pleated' fuel cell structure. The ends of this structure are potted to form a seal, whereupon the entire structure is mounted on a manifold.

In certain preferred embodiments, the layer thickness T is approximately 1 mm, and the length of the pleat L is about 0.4 mm. Active regions have height H of 0.6 mm and the overall pleats have a width along the trough of between 6 and 50 mm. Typically pleated layers incorporate at least 10 troughs and peaks, if not hundreds of these on a single layer. An electrochemical cell according to this invention may have as few as 1 unit cell or may have a very large number, thousands or even millions, of unit cells formed on one pleated substrate. Electrochemical cell structures made according to some embodiments of this invention have, in the range of 10 to 120 unit cells, for example.

Especially when the thickness of the undulating layer is small, a gas diffusion media may not be required. In the absence of electrically conducting gas diffusion media, electrical conductors may be provided to collect current from electrodes 506 and 507. Such conductors may be formed on or in layer 302. In configurations which do not include gas diffusion media (e.g. where troughs 305 and 306 are open) the relative dimensions of the three dimensional folding of sheet 302 may be substantially changed. In the absence of a gas diffusion media it is easier for greater mass transfer of reactants into electrodes 506 and 507 to occur, even if troughs 305 and 306 are made narrower and/or deeper. However, this creates design challenges in providing a way to carry electrical current to and from the catalyst-containing electrodes 506 and 507.

The improvements in mass transport that can be achieved by eliminating gas diffusion media and the increase in the effective areas of ion-conducting regions 404 that can then be achieved by making troughs 305 and 306 deeper and shorter (increasing T and decreasing L) to yield higher ratios of actual to projected areas of ion conductivity must be traded off against the increased difficulty in providing electrical interconnections in the absence of a diffusion media that can be made electrically conducting. The challenges of providing highly conductive electrically conducting paths to carry electrical current to and from individual electrochermical cells tend to push the designer to contemplate shallower undulations with overall decreased current conducting paths in electrodes. Various alternative configurations of electrical- and ion-conducting regions 402 and 404 therefore present themselves.

In some alternative configurations current is transported between unit cells using circuit board traces laid on the substrate. The traces may be made using printed circuit fabricating techniques, for example. In such embodiments, electrical current does not travel through the gas diffusion medium but is transported on the surface of or within the substrate material.

Apparatus comprising a number of electrochemical cells, such as fuel cells, may be made by forming ion-conducting regions and, in some cases, electrically conductive regions in a sheet 302 of a suitable material. Catalyst-containing electrodes are provided in many cases and some means for delivering and/or collecting electric current must be provided. Electrodes may be formed directly on the ion-conducting regions of sheet 302 using 'catalyst coated membrane' methods which are known to those skilled in the art of fuel cell manufacturing. In other embodiments, the electrochemical cell may function with electrodes without the need for a catalyst.

Figure 6A:
FIGS. 6A–6H illustrate a series of steps for fabricating electrochemical cells.
Figure 6B:
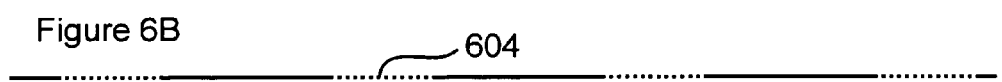
Figure 6C:
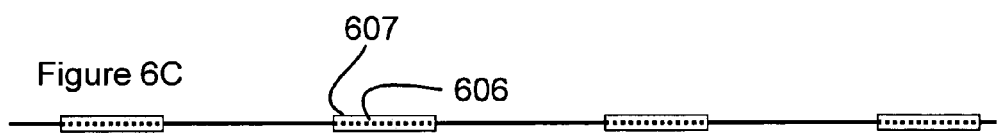

FIGS. 6A through 6H illustrate intermediate stages in an example process for making a pleated fuel cell structure beginning with a sheet 602 of gas barrier material. FIG. 6A shows a flat unitary sheet 602 of a gas barrier material. FIGS. 6B and 6C illustrate how areas of a substrate can be made conductive to electricity. In FIG. 6B, sets of first apertures 604 have been made through sheet 602 in those regions where it is desired to provide electrically-conductive areas 402. In FIG. 6C, first apertures 604 have been filled with an electrically-conducting material 606 to provide electrically-conducting regions 402. Material 606 plugs apertures 604 and provides an electrically-conducting surface 607 on each face of sheet 602. Sheet 602 is impermeable to reactants.

Areas of a substrate may be made conductive to electricity by plating the surface of the areas and by forming electrically conducting vias through the substrate 602. This can be done using any suitable technique including the wide range of techniques known in the circuit board industry for forming electrical connections between conductors on either face of a circuit board. The technique used should provide sufficiently low resistance between one face of the substrate and the other and also preserve the reactant barrier properties of the substrate 602.

Figure 6D:
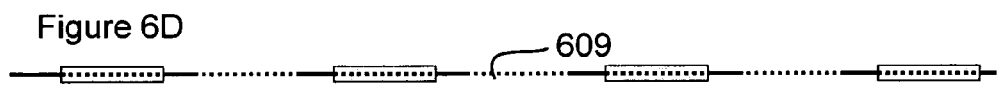
Figure 6E:

In FIG. 6D, sets of second of apertures 609 have been formed in sheet 602 in areas where it is desired to have ion-conducting regions 404. Sets of second apertures 609 alternate with sets of first apertures 604 along sheet 602. The apertures 609 may be formed by any suitable method, for example using laser micro-machining. In FIG. 6E, second apertures 609 are filled with ion-conducting material 611 to provide ion-conducting regions 404. The apertures 609 can be filled with a suitable ion conductor such as Nafion™ (which is a proton conductor), other suitable ionomers or other suitable ion conductors to create regions of ion conductivity 404.

The steps illustrated in 6D and 6E may be performed according to methods known in the art and/or as described in commonly assigned co-pending U.S. patent application titled "Micro-Structured Composite Membranes and Electrochemical Cells Incorporating Such Membranes", which is incorporated by reference herein. Material 611 plugs second apertures 609. Apertures 609 filled with material 611 provide paths by which ions can pass through sheet 602. A Nafion™ dispersion, a composite electrolyte, can be used as material 611 to be match a highly structured microporous membrane rather than to a more random microporous membrane. Nafion™ has been demonstrated to provide a suitable seal against hydrogen leaks.

Figure 6F:
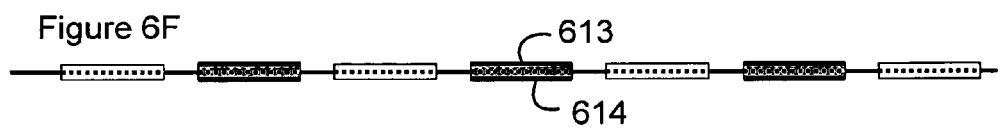
Figure 6G:
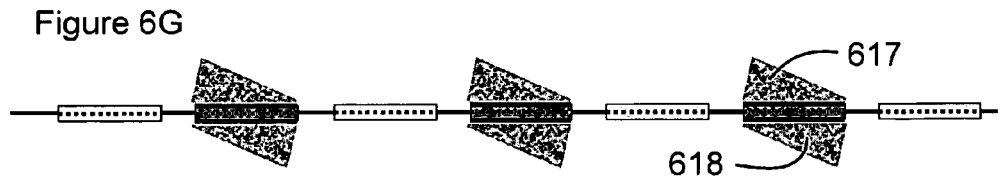

In FIG. 6F, electrically conductive catalyst layers 613 and 614 have been applied on opposite faces of ion-conducting regions 404. In FIG. 6G, electrically-conductive gas diffusion media 617 and 618 has been deposited onto electrically-conductive regions 402. Finally, in FIG. 6H, sheet 602 has been folded into a pleated structure. Those skilled in the art will appreciate that the sequence of operations described above in relation to FIGS. 6A through 6H may be varied.

Figure 6H:

When the structure of FIG. 6H is used as a fuel cell, electrically-conductive regions 402 act as bipolar separators between neighboring unit cells. Ion-conducting regions 404 are catalysed, and the electrically-conductive porous gas diffusion media provide means for electron transport between adjacent unit cells.

Figure 7A:
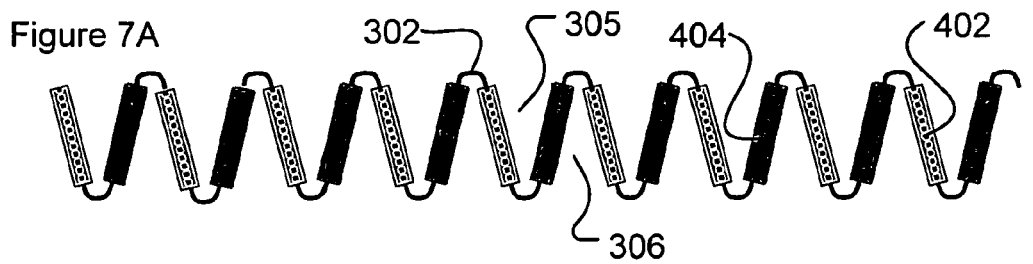
FIGS. 7A–7C illustrate a series of steps for applying gas diffusion media to electrochemical cells.
Figure 7B:
Figure 7C:
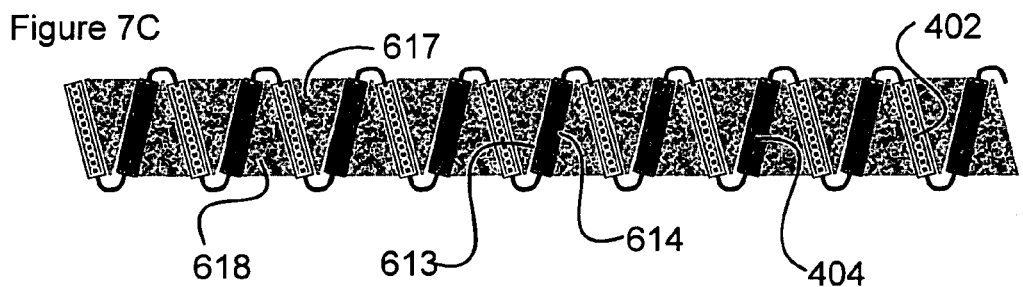

FIGS. 7A through 7C show intermediate stages in an alternative method for making a pleated fuel cell. In FIG. 7A an undulating sheet 302 having electrically conductive areas 402 and ion-conducting areas 404 is provided. Sheet 302 may be formed, for example, as illustrated in FIGS. 6A to 6F and then folding the resulting sheet. In FIG. 7B, a gas diffusion material 618, such as an ink or a powder, has been deposited in troughs 305. For embodiments in which the gas diffusion material 618 is a powder, it may be tamped into place and sintered. In FIG. 7C a powdered gas diffusion material 617 has been deposited in troughs 306, tamped into place and sintered. In an alternative method, gas diffusing material 618 may be pre-formed to fit into troughs 305.

A pleated structure as described herein can support unit electrochemical cells which can be electrically interconnected with one another to form series, parallel or series-parallel groupings in a variety of ways. In the bipolar configurations illustrated in FIGS. 4 and 5, unit cells 401 are connected in series with other unit cells.

Figure 8:
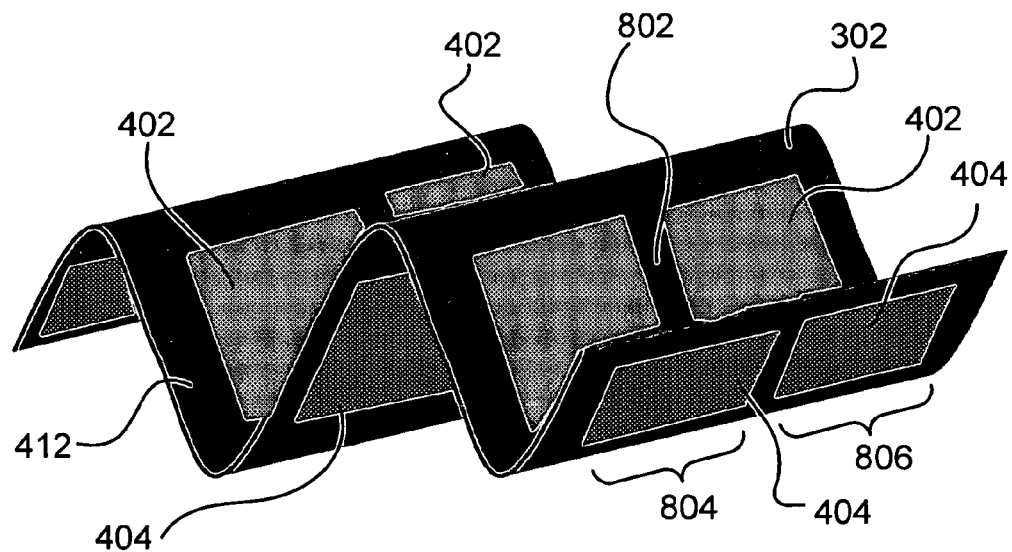
FIG. 8 is a perspective view of a substrate sheet having two rows of alternating electrically-conductive regions and ion-conductive regions.

For example, FIG. 8 shows an undulating sheet 802 which has two rows 804 and 806 of alternating electrically-conductive regions 402 and ion-conductive regions 404. Two rows of series-connected fuel cells may be formed on sheet 802 using the methods described above. The rows of fuel cells may be electrically independent from one another or they may be connected in parallel with one another.

Interconnection of different unit cells may be made, for example, by way of one or more suitable combinations of:
  conductive gas diffusion media;
  electrically conductive regions 402 which conduct electricity from one face of sheet 302 to the other;
  conductive traces formed on a surface of sheet 302;
  conductive traces formed within sheet 302; and,
  separate conductors.

Figure 9:
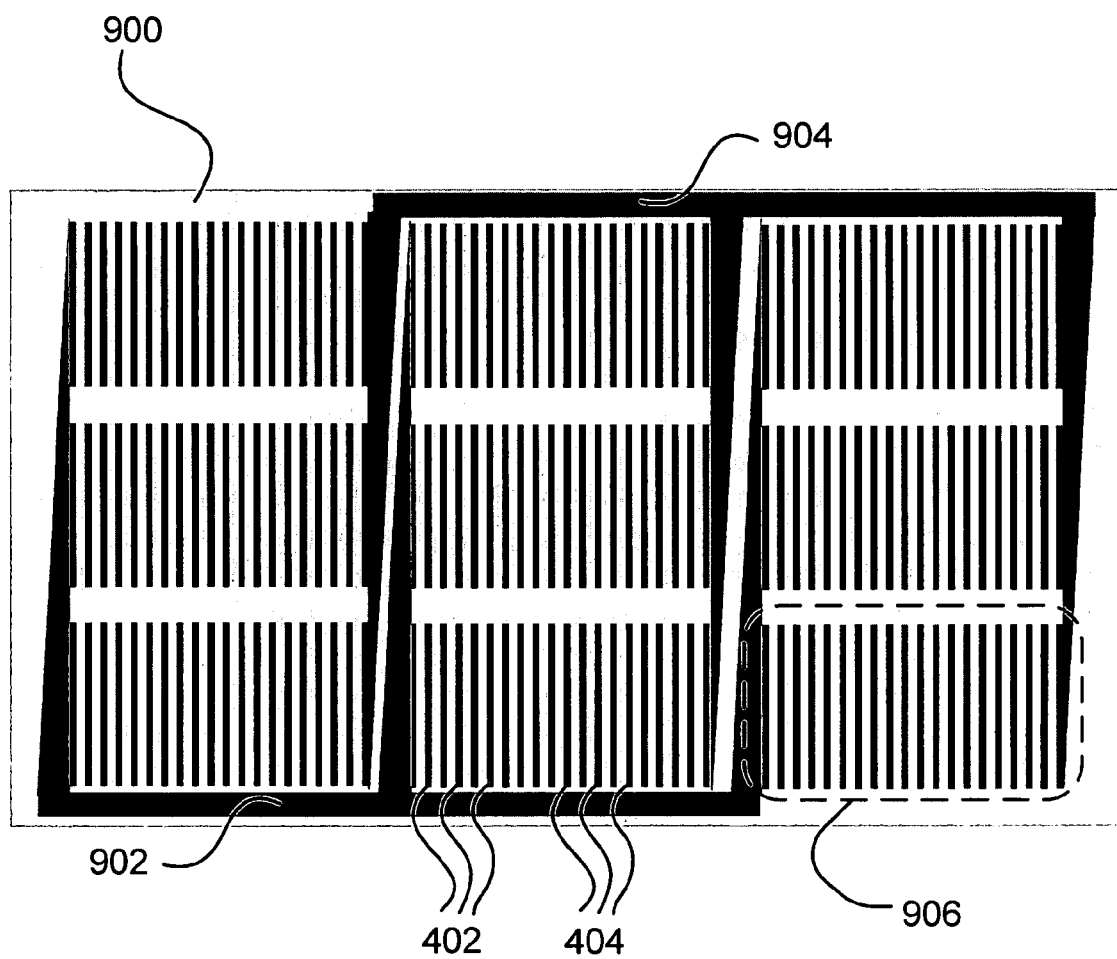
FIG. 9 is a schematic of a 3×3 parallel-series electrochemical cell layer.

FIG. 9 illustrates the use of conductive traces to interconnect sets of series-connected unit cells in parallel with one another. FIG. 9 shows a sheet 900 laid flat and ready to be folded to form an array of fuel cells. In this example, sheet 900 comprises a circuit board substrate. Current collecting traces 902, 904 are formed on one face of sheet 900.

Sheet 900 has 9 patterned areas 906 having an alternating sequence of electron conducting regions 402 and ion-conducting regions 404. Each patterned area 906, when pleated can provide a sequence of series-connected fuel cells. Current collecting traces 902, 904 formed on sheet 900 connect the groups of fuel cells in parallel.

Figure 10A:
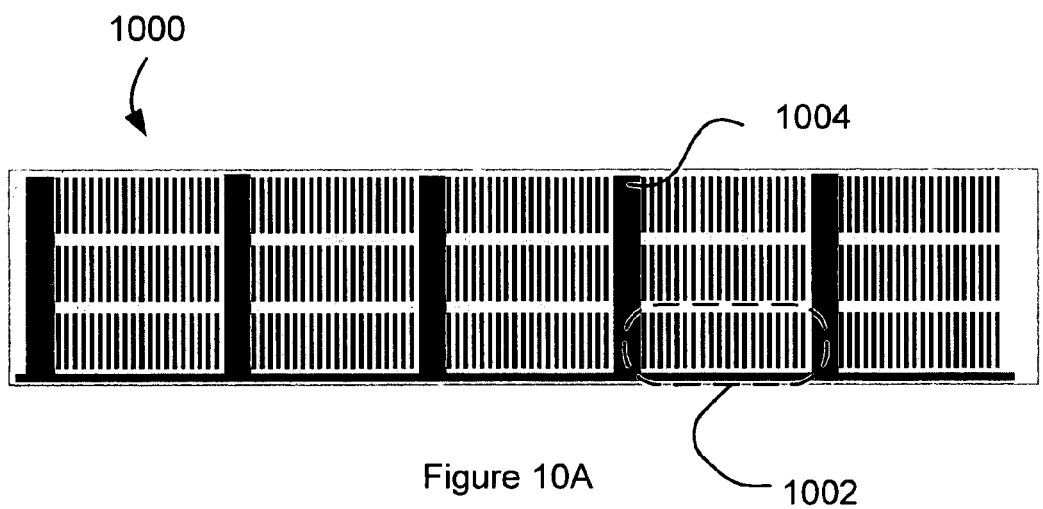
FIGS. 10A and 10B are schematics of top and bottom side layouts of an electrochemical cell layer having 15 groups of electrochemical cells connected in parallel.
Figure 10B:
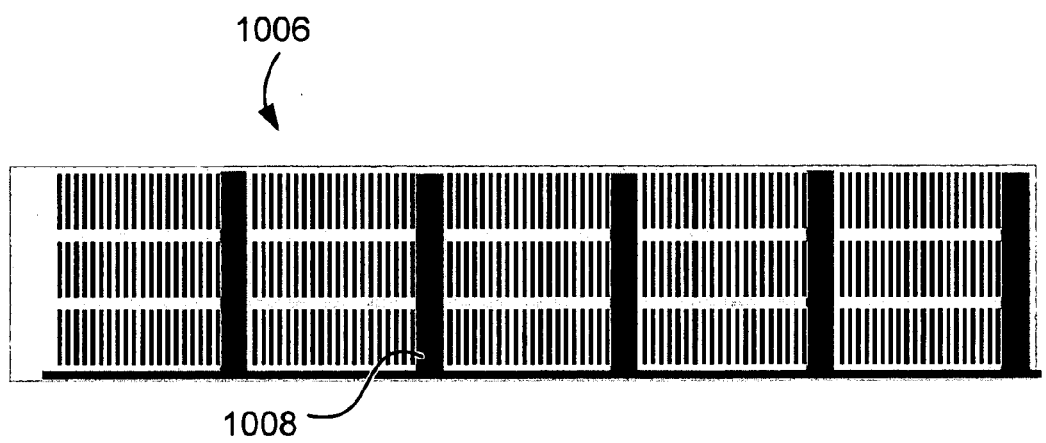

FIGS. 10A and 10B show a sheet 1000 having a 5×3 arrangement of 15 patterned areas 1002 having an alternating sequence of electron conducting regions 402 and ion-conducting regions 404 of alternating electrically-conductive regions 402 and ion-conducting regions 404. Sheet 1000 is laid flat before pleating. The top face layout 1002 has current collecting trace 1004 and the bottom face layout 1006 has current collecting trace 1008.

Figure 11:
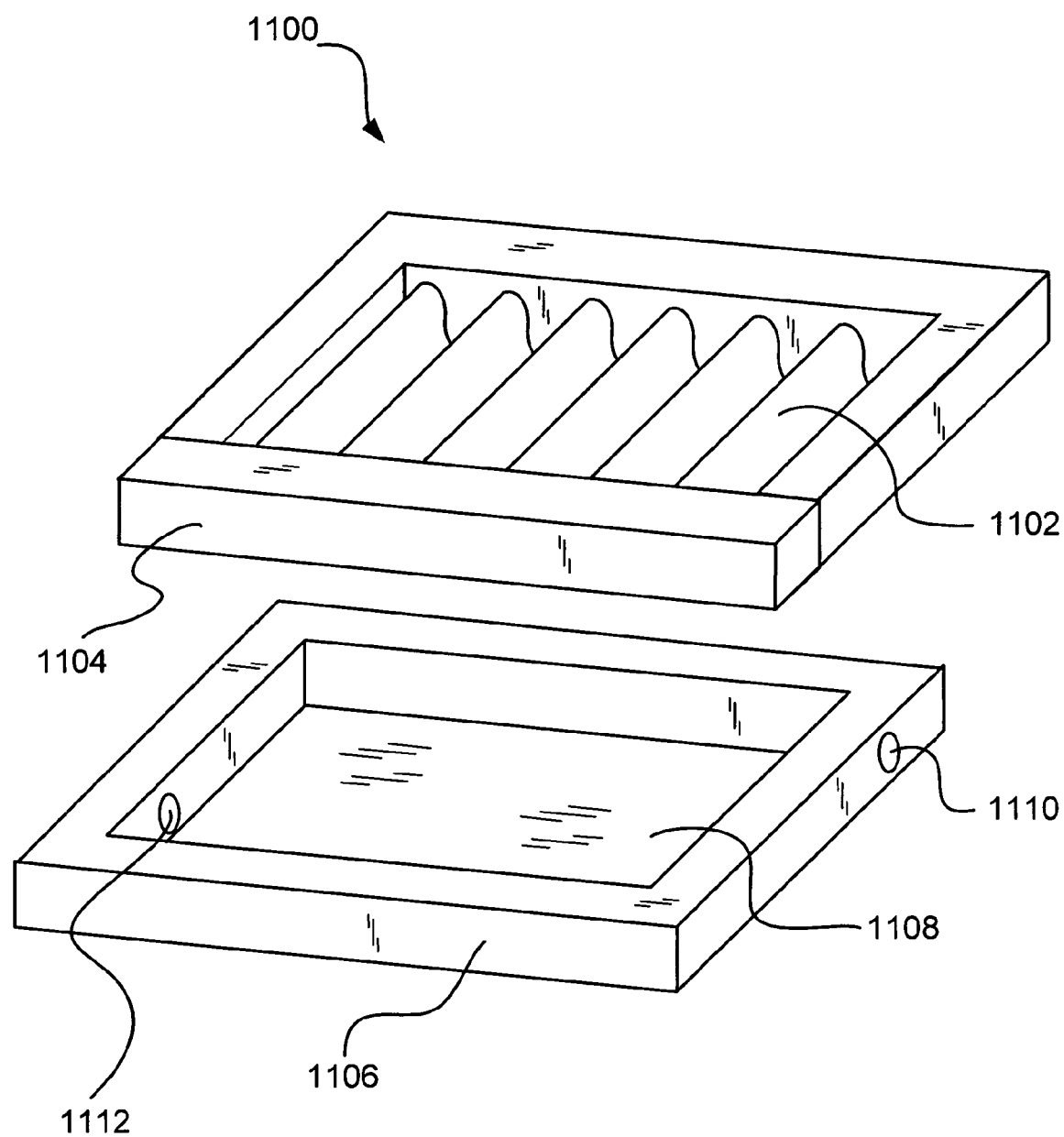
FIG. 11 is an exploded perspective view of an electrochemical cell with a reactant plenum.

FIG. 11 shows an exploded perspective view of an electrochemical reactor arrangement 1100 having a reactant plenum 1108 provided under undulating sheet 1102. Sheet 1102 is sealed to substrate frame 1104, which in turn is sealed to plenum base 1106. This embodiment has a reactant inlet 1110 and a reactant outlet 1112. It is to be understood that the pleated substrate sheet 1102 could be connected to a plenum in any number of ways known to the art, including by adhesive, injection-molding, or any other suitable method.

Figure 12:
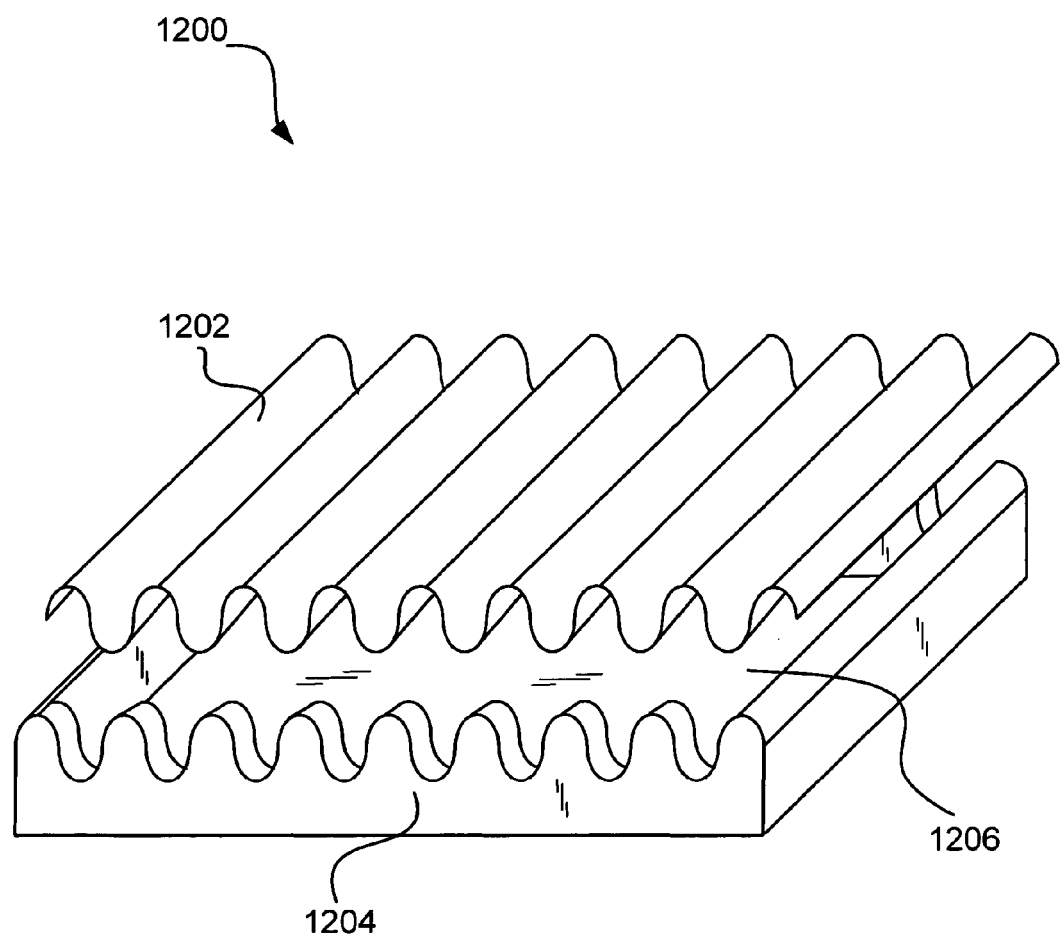
FIG. 12 is an exploded perspective view of another embodiment of an electrochemical cell with a reactant plenum.

FIG. 12 shows an exploded perspective view of electrochemical reactor arrangement 1200 having a reactant plenum 1206 provided under undulating sheet 1202. In this embodiment, sheet 1202 is connected directly to the plenum base 1204.

Figure 13:
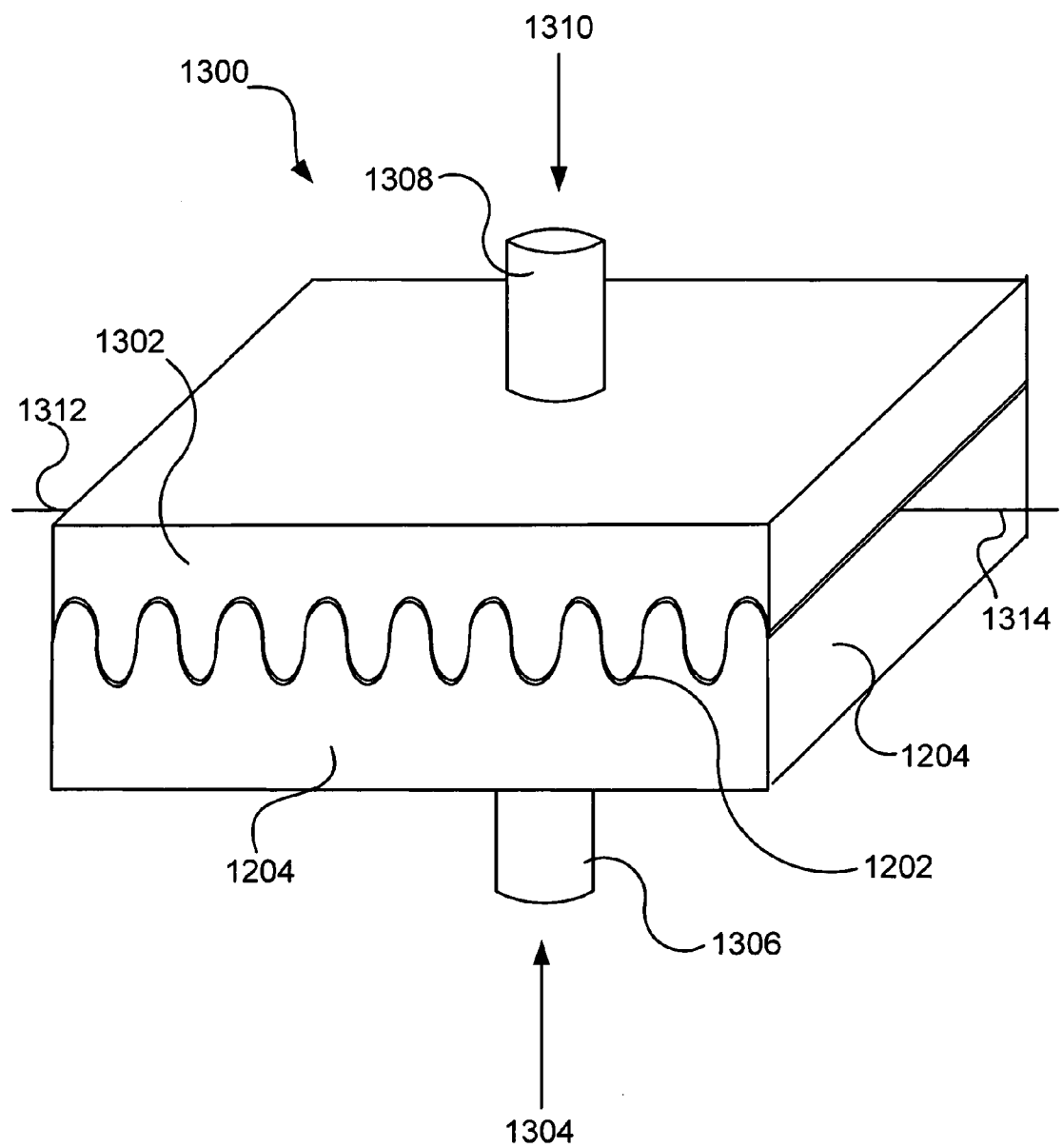
FIG. 13 is a perspective view of an electrochemical cell with two reactant plenums.

In FIG. 13, electrochemical reactor 1300 comprises an oxidation reactor plenum 1302 and a reduction reactor plenum 1204 on opposing faces of sheet 1202. Oxidation reactant 1310 passes through oxidation passageway 1308 into oxidation plenum 1302. Reduction reactant 1304 passes through reduction channel 1306 to reduction plenum 1204. Electrical conduits 1312 and 1314 carry electrical current to and from electrochemical reactor 1300. Plenum 1310 may be used for introduction of fuel, such as hydrogen gas, on one side of the substrate and plenum 1304 for the introduction of air, oxygen, or another oxidizer on the opposing side of the substrate 1202.

Sealing in the pleated layer is reduced to sealing the edges of the layer. The sealing step may be performed in a manner similar to the manner in which semiconductor chips are mounted on chip carriers.

The mechanical properties of the substrate 302 affect how tightly the pleated layer can be pleated. A pleated layer thickness of 0.5 mm and a pleat repeating period of 0.3 mm are near the lower bounds on pleating with some readily available techniques. A 1 mm height by 1 mm pitch pleating is practical using simple tooling. Circuit board material will hold its 'set' after pleating but other means of retaining the pleated structure may be provided.

The lower bound on design dimensions is limited by the minimum bending radius of the substrate. By selecting substrates which can be bent sharply, the 'overhead' of the structure can be very small. For a 12 micron thick substrate the lower bound on overhead may be in the range of about 150 microns. In some embodiments using more flexible substrate materials the overhead may be 25 microns or less.

Manifolding and sealing may be performed using chip carrier packages. Large chip carrier packages are <2 mm thick, and offer footprint areas between 1 $cm^2$ and 10 $cm^2$. At 100 mW/$cm^2$ such packages support power generating devices between 100 mW and 2 W, making them ideal for application to portable electronics. Furthermore, the industry is comfortable handling these devices which already have electrical connection capability built-in.

As will be apparent to those skilled in the art in the light of the foregoing disclosure, many alterations and modifications are possible in the practice of this invention without departing from the spirit or scope thereof. For example:

The pleated structure described herein may be used to provide electrolysis cells as well as fuel cells.

While undulating sheet 302 is depicted as having smooth rounded undulations, the bends in sheet 302 could be more sharply creased without departing from the invention.

The invention is not limited to electrochemical cells for gaseous reactants. Electrochemical cells according to the invention may be designed to work with liquid reactants or with both liquid and gaseous reactants.

Accordingly, the scope of the invention is to be construed in accordance with the substance defined by the following claims.

What is claimed is:

1. An electrochemical cell comprising:
a continuous sheet of substrate material having first and second faces, the substrate material folded to form an undulating sheet having a first plurality of troughs on the first face and a second plurality of troughs on the second face, the troughs of the first plurality of troughs alternating with the troughs of the second plurality of troughs along the undulating sheet so that each trough of the first plurality of troughs has a first wall in common with a corresponding adjacent one of the second troughs;
an ion-conducting region on each of the first walls, the ion-conducting regions allowing ions to pass through the substrate material between the corresponding first and second troughs;
each of the first troughs comprising a first electrode in ionic-communication with the ion-conducting region;
each of the second troughs comprising a second electrode in ionic-communication with the ion-conducting region;
wherein: the first wall is electrically insulating, the substrate comprises a first electron-conducting region that allows electricity to pass through the substrate material, and the first electron conducting region is located in a second wall of each of the first troughs opposed to the first wall.

2. An electrochemical cell according to claim 1 comprising
a first catalyst for promoting a reduction electrochemical reaction in each first trough and in electrical contact with the first electrode and a second catalyst for promoting an oxidation electrochemical reaction in each second trough and in electrical contact with the second electrode.

3. An electrochemical cell according to claim 1 wherein at least one of the troughs is filled with a diffusion medium.

4. An electrochemical cell according to claim 1 wherein at least one of the troughs is filled with an electrically conductive diffusion medium.

5. An electrochemical cell according to claim 4 wherein the electrically conductive diffusion medium is in electrical contact with one of the first and second electrodes.

6. An electrochemical cell comprising:
a continuous sheet of substrate material having first and second faces, the substrate material folded to form an undulating sheet having a first plurality of troughs on the first face and a second plurality of troughs on the second face, the troughs of the first plurality of troughs alternating with the troughs of the second plurality of troughs along the undulating sheet so that each trough of the first plurality of troughs has a first wall in common with a corresponding adjacent one of the second troughs;

an ion-conducting region on each of the first walls, the ion-conducting regions allowing ions to pass through the substrate material between the corresponding first and second troughs;

each of the first troughs comprising a first electrode in ionic-communication with the ion-conducting region;

each of the second troughs comprising a second electrode in ionic-communication with the ion-conducting region;

wherein at least one of the troughs is filled with an electrically conductive diffusion medium;

wherein the electrically conductive diffusion medium is in electrical contact with one of the first and second electrodes and the substrate comprises an electron-conducting region wherein electricity can pass through the substrate material, and the electrically-conductive diffusion medium provides an electrical connection between the one of the first and second electrodes and the electron-conducting region.

7. An electrochemical cell according to claim 4 wherein the electrically-conductive diffusion medium comprises one or more conducting materials selected from a group consisting of: porous metals, porous carbon paper, porous carbon of other forms, electrically-conducting inks, electrically-conducting powders, and combinations thereof.

8. An electrochemical cell according to claim 3 wherein the diffusion medium comprises one or more non-conducting materials selected from a group consisting of porous polymers, porous non-conductive media formed from inks, and porous non-conductive media formed from powders.

9. An electrochemical cell according to claim 1 wherein the substrate constitutes a portion of a wall of a first plenum into which a first reactant may be introduced.

10. An electrochemical cell according to claim 1 wherein the substrate constitutes a portion of a wall separating a first plenum from a second plenum.

11. An electrochemical cell according to claim 1 wherein the ion-conducting region is a proton conducting region.

12. An electrochemical cell according to claim 1 wherein the electrochemical cell is a fuel cell.

13. An electrochemical cell according to claim 12 wherein the electrochemical cell is a hydrogen-fueled fuel cell.

14. An electrochemical cell according to claim 1 wherein the electrochemical cell is an electrolysis cell.

15. An electrochemical cell according to claim 1 wherein the substrate comprises a flexible dielectric circuit board material.

16. An electrochemical cell according to claim 1 comprising a plurality of unit cells each associated with one of the ion-conducting regions and corresponding ones of the first and second electrodes, the electrochemical cell comprising an electrically conducting trace on the substrate, the trace interconnecting the first electrodes of a plurality of the unit cells.

17. An electrochemical cell according to claim 16 wherein a height, H, of at least some of the ion-conducting regions is at least equal to a distance, L, between corresponding parts of two successive ones of the first troughs.

18. An electrochemical cell according to claim 16 wherein a height, H, of at least some of the ion-conducting region is at least 1.5 times greater than a distance, L, between corresponding parts of two successive ones of the first troughs.

19. An electrochemical cell according to claim 1 wherein the ion-conducting regions each have a surface area and each pair of the first and second troughs have a projected area, wherein the surface area of at least some of the ion-conducting regions is at least about 100% of the projected area of the corresponding pair of first and second troughs.

20. An electrochemical cell according to claim 1 wherein the ion-conducting regions each have a surface area and each pair of the first and second troughs have a projected area, wherein the surface area of at least some of the ion-conducting regions is at least about 150% of the projected area of the corresponding pair of first and second troughs.

21. An electrochemical cell comprising:
a continuous sheet of substrate material having first and second faces, the substrate material folded to form an undulating sheet having a first trough on the first face and a second trough on the second face the first trough adjacent to the second trough and having a first wall in common with the second trough;
an ion-conducting region on the first wall, the ion-conducting region allowing ions to pass through the substrate material between the first and second troughs;
first and second electrodes in ionic-communication with the ion-conducting region, the first and second electrodes located in the first and second troughs respectively;
wherein the substrate comprises a first electron-conducting region that allows electricity to pass through the substrate material and the first electron conducting region is located in a second wall of the first trough opposed to the first wall.

22. An electrochemical cell according to claim 21 wherein the first wall is electrically insulating.

23. An electrochemical cell according to claim 21 comprising
a first catalyst for promoting a reduction electrochemical reaction in the first trough and in electrical contact with the first electrode and a second catalyst for promoting an oxidation electrochemical reaction in the second trough and in electrical contact with the second electrode.

24. An electrochemical cell according to claim 21 comprising first and second diffusion media in the first and second troughs respectively.

25. An electrochemical cell according to claim 21 wherein the first and second diffusion media are electrically conductive.

26. An electrochemical cell according to claim 21 wherein the electrochemical cell is an electrolysis cell.

27. An electrochemical cell according to claim 21 wherein:
the substrate comprises a second electron-conducting region that allows electricity to pass through the substrate material, the second electron conducting region located in a second wall of the second trough opposed to the first wall.

28. An electrochemical cell according to claim 21 comprising:
a first catalyst for promoting a reduction electrochemical reaction in the first trough and in electrical contact with the first electrode and a second catalyst for promoting an oxidation electrochemical reaction in the second trough and in electrical contact with the second electrode.

29. An electrochemical cell according to claim 3 wherein the diffusion medium comprises polytetrafluoroethylene.

* * * * *